United States Patent Office 3,558,586
Patented Jan. 26, 1971

3,558,586
POLYMERIZATION PROCESS AND CATALYST SYSTEM
Lawrence M. Fodor, Bartlesville, Okla., assignor to Phillips Petroleum Company, a corporation of Delaware
No Drawing. Filed Feb. 14, 1968, Ser. No. 705,520
Int. Cl. C08f 1/56, 3/10
U.S. Cl. 260—93.7                                10 Claims

ABSTRACT OF THE DISCLOSURE

Utilization of a catalyst system formed by admixing (a) a compound of the formula $R_nAlX_{3-0}$; (b) a titanium trichloride-aluminum trichloride complex of the approximate formula $TiCl_3 \cdot 1/3 AlCl_3$; and (c) a phosphite having the formula $(R'O)_3P$ or a phosphonite having the formula $(RO)_2PR$ in the polymerization of 1-olefins results in the production of polymers having higher modulus and lower xylenes-soluble content. In the above formulas, R is selected from alkyl, cycloalkyl, and aryl groups, and combinations thereof, having from 1 to 12 carbon atoms, R' is selected from mono- or dihalo-substituted alkyl, cycloalkyl, and aryl groups and combinations thereof having from 1 to 12 carbon atoms, and $n$ is 1 or 2.

BACKGROUND OF THE INVENTION

Polymers of alpha-olefins, particularly of propylene, have long been known and numerous procedures have been disclosed for their production. These polymers are characterized by a greater or lesser degree of stereospecificity; they also vary in degree of crystallinity. Many of the useful properties of these polymers such as ultimate tensile, hardness, range of melting temperature, etc., appear to depend upon the crystallinity of the polymer. Flexural modulus, a property readily measurable by standard procedures, provides a reliable and consistent means for characterizing these polymers. The higher the crystallinity of a polymer, the higher the flexural modulus values are found to be. For a commercially attractive product, flexural modulus values must be high, preferably above 190,000 p.s.i. Heretofore, it has frequently been necessary to extract amorphous fractions of the polymer in order to provide products having flexurable moduli in this range. It is therefore highly desirable to minimize the production of amorphous polymer, as measured for example by the amount of polymer soluble in mixed xylenes.

It is thus an object of this invention to provide an improved process for the production of olefin polymers.

Another object of this invention is to provide a polymerization process in which there is obtained an increase in flexural modulus and/or a decrease in the xylenes-soluble content of the polymer.

A further object of this invention is to provide a novel catalyst system which when employed in a polymerization process results in an increase of the flexural modulus and/or a decrease of xylenes-soluble content of the resulting polymer.

Other aspects, objects, and the several advantages of this invention will be apparent to those skilled in the art upon consideration of this disclosure.

According to this invention, I have discovered that polymers of 1-olefins (alpha olefins) can be obtained having increased flexural modulus values and/or decreased xylenes-soluble content when the polymerization is conducted in the presence of an organometal modified catalyst system formed by admixing (a) an organoaluminum compound or mixture of compounds of the formula $R_nAlX_{3-n}$ wherein R is alkyl, cycloalkyl, aryl or combinations thereof having 1 to 12 carbon atoms, X is a halogen and $n$ is 1 or 2, (b) a titanium trichloride-aluminum trichloride complex such as that resulting from the reaction of titanium tetrachloride and aluminum and having the approximate formula $TiCl_3 \cdot 1/3 AlCl_3$ and (c) a phosphorus compound selected from those of the formula $(R'O)_3P$ and $(RO)_2PR$, wherein R is alkyl, cycloalkyl, aryl or combinations thereof of having 1 to 12 carbon atoms, and R' is selected from mono- or dihalosubstituted alkyl, cycloalkyl, and aryl groups and combinations thereof having from 1 to 12 carbon atoms.

The enumeration of alkyl, cycloalkyl and aryl radicals herein in defining the formulas is intended to include the various mixed radicals such as alkaryl, aralkyl, alkylcycloalkyl, cycloalkylaryl, and the like.

The compounds and mixtures of compounds represented by the formula $R_nAlX_{3-n}$ and utilized as component (a) of the catalyst system of the invention are well known in the art. Examples of such compounds are diethylaluminum chloride, ethylaluminum dichloride, ethylaluminum sesquichloride and the like.

The titanium chloride-aluminum chloride complex utilized as component (b) of the catalyst system according to this invention is also well known in the art. It can be formed, for example, by reacting titanium tetrachloride with metallic aluminum. The complex can be represented by the formula $TiCl_3 \cdot 1/3 AlCl_3$.

Examples of the phosphite adjuvants having the formula $(R'O)_3P$ are tris(2-chloroethyl)phosphite,
tris(1,2-dichloroethyl)phosphite,
tris(4-bromophenyl)phosphite,
tris(3-iodocyclopentyl)phosphite,
tris(chloromethyl)phosphite,
tris(1,6-difluorohexyl)phosphite,
tris[1-chloro-6(2-bromophenyl)hexyl]phosphite,
tris[1-(2,4-dichloro-7-ethylnaphthyl)]phosphite,
tris(2-bromo-4-methylcyclohexyl)phosphite,
tris(3-iodo-5-phenylcyclopentyl)phosphite,
tris[2-(3-chlorophenyl)cyclohexyl]phosphite, and the like.

Examples of the phosphonite adjuvants having the formula $(RO)_2PR$ are octyldiphenyl phosphonite, triphenyl phosphonite, triethyl phosphonite, cyclohexyldibenzyl phosphonite, methyldidodecyl phosphonite, dodecyldihexyl phosphonite, cyclohexyldibenzyl phosphonite, tri(1-naphthyl)phosphonite, 1-methylcyclohexyldioctyl phosphonite, 4-hexylphenyldicyclopentyl phosphonite, and the like. The R group attached directly to the phosphorus atom can be the same or different from those in the —OR groups.

Broad and preferred ranges for the molar ratio of the catalyst components are:

| Ratio to $TiCl_3 \cdot 1/3 AlCl_3$ | Broad | Preferred |
|---|---|---|
| $R_nAlX_{3-n}$ | 0.5:1–10:1 | 1:1–7.5:1 |
| Adjuvant | 0.01:1–1:1 | 0.05:1–0.5:1 |

The total catalyst concentration is usually in the range 0.005 to 10 weight percent of the olefin being polymerized, but concentrations outside this range are operative.

The polymerization reaction is carried out either in a mass system—i.e., the olefin being polymerized acts as reaction medium—or in an inert hydrocarbon diluent, such as a paraffin, cycloparaffin, or aromatic hydrocarbon or mixtures thereof having up to 20 carbon atoms per molecule. Examples of hydrocarbons that can be used are pentane, hexane, heptane, isooctane, eicosane, cyclohexane, methylcyclopentane, benzene, toluene, naphthalene, anthracene, and the like. When an inert diluent is used, the volume ratio of diluent to olefin is in the range of 1:1 to 10:1, preferably 3:1 to 7:1.

The polymerization is conducted at temperatures in the range of 80 to 250° F., preferably 100 to 200° F. The pressure can be sufficient to maintain the reaction mixture substantially in liquid phase, or—particularly in a mass system—can be such that the olefin is in the gas phase. The reaction time is in the range of 10 minutes to 75 hours, more frequently 30 minutes to 25 hours.

Although the invention is illustrated by the polymerization of propylene, any aliphatic 1-olefin having up to 8 carbon atoms per molecule can be used. Preferably those having 3 to 7 carbon atoms are used, such as propylene, 1-butene, 1-hexene, 4-methyl-1-pentene, 1-heptene, and the like. Copolymers of two or more of these olefins can be prepared using the catalyst composition of this invention.

It is within the scope of the invention to use hydrogen in a concentration of about 0.08 to 1 mol percent of the propylene for controlling the molecular weight of the polymer.

The following example will further illustrate the invention, although it is not intended that the invention be limited thereto.

EXAMPLE

Data illustrating the process of the invention were obtained by polymerizing propylene in a one-liter, stirred reactor in 2.5-hour runs at 130° F. and about 300 p.s.i.g. with 250 grams of propylene and 1 liter of hydrogen (equivalent to 0.67 mol percent hydrogen on the propylene) present in the reaction system.

The following results were obtained:

| Run No. | Mol ratio[a] $R_nAlX_{3-n}$ | Mol ratio[a] Adjuvant | Mol ratio[a] $TiCl_3 \cdot \tfrac{1}{3}AlCl_3$ | Catalyst, weight percent[b] | Productivity, g./g. of Ti complex | Flexural modulus, p.s.i. x $10^{-3}$ [c] | Xylenes soluble, weight percent[d] | Melt flow[e] | Adjuvant |
|---|---|---|---|---|---|---|---|---|---|
| 1 | 2 | 0 | 1 | 0.178 | 464 | 207 | 5.8 | 1.14 | None |
| 2 | 2 | 0.10 | 1 | 0.188 | 401 | 254 | 3.5 | 3.27 | $(ClCH_2CH_2O)_3P$ |
| 3 | 2 | 0.20 | 1 | 0.199 | 248 | 255 | 4.6 | 1.44 | $(ClCH_2CH_2O)_3P$ |
| 4 | 3 | 0 | 1 | 0.228 | 685 | 180 | 6.5 | 0.70 | None |
| 5 | 3 | 0.10 | 1 | 0.240 | 689 | 195 | 5.2 | 0.58 | $C_8H_{17}P(OC_6H_5)_2$ |
| 6 | 3 | 0.20 | 1 | 0.251 | 667 | 191 | 4.8 | 0.32 | $C_8H_{17}P(OC_6H_5)_2$ |
| 7 | 3 | 0.30 | 1 | 0.266 | 620 | 195 | 5.6 | 0.65 | $C_8H_{17}P(OC_6H_5)_2$ |
| 8 | 3 | 0 | 1 | 0.226 | 795 | 188 | 6.6 | 1.04 | None |
| 9 | 3 | 0.10 | 1 | 0.238 | 723 | 202 | 5.5 | 0.67 | $C_6H_5P(OC_6H_5)_2$ |
| 10 | 3 | 0.20 | 1 | 0.250 | 661 | 211 | 4.0 | 1.16 | $C_6H_5P(OC_6H_5)_2$ |

[a] $R_nAlX_{3-n}$ was diethylaluminum chloride in all runs.
[b] Based on propylene.
[c] ASTM D 790-61.
[d] Determined by placing 0.95 g. of polymer in a centrifuge tube, adding 95 ml. mixed xylenes, heating for 15 minutes at 285° F., cooling, centrifuging, evaporating the solvent from a 25 ml. aliquot of the supernatant liquid, weighing the residue, and multiplying by 400.
[e] ASTM D 1238-62T, Condition L.

The above data show that utilization of the catalyst system of the invention results in a decrease in xylenes-soluble content and an increase in flexural modulus of the polymer obtained therewith.

Reasonable variations and modifications of this invention can be made, or followed, in view of the foregoing disclosure, without departing from the spirit or scope thereof.

I claim:

1. A catalyst system formed on admixing (a) a compound of the formula $R_nAlX_{3-n}$ wherein R is alkyl, cycloalkyl, aryl or combinations thereof having 1 to 12 carbon atoms, X is a halogen, and $n$ is 1 or 2, (b) a titanium trichloride-aluminum trichloride complex having the approximate formula $TiCl_3 \cdot \tfrac{1}{3}AlCl_3$ and (c) a compound selected from those of the formulas $(R'O)_3P$ and $$(RO)_2PR$$

wherein R is an alkyl, cycloalkyl, aryl or combinations thereof having 1 to 12 carbon atoms, and R' is selected from mono- or dihalo-substituted alkyl, cycloalkyl, and aryl groups and combinations thereof having from 1 to 12 carbon atoms and wherein the ratio of the compound (a) to the compound (b) is in the range of 0.5:1 to 10:1 and the ratio of the compound (c) to the compound (b) is in the range of 0.01:1 to 1:1.

2. A catalyst system according to claim 1 formed by admixing (a) diethylaluminum chloride, (b) titanium trichloride-aluminum trichloride complex, and (c) tris(2-chloroethyl) phosphite.

3. A catalyst system according to claim 1 formed by admixing (a) diethylaluminum chloride, (b) titanium trichloride-aluminum trichloride complex, and (c) octyldiphenyl phosphonite.

4. A catalyst system according to claim 1 formed by admixing (a) diethylaluminum chloride, (b) titanium trichloride-aluminum trichloride complex, and (c) triphenyl phosphonite.

5. A process which comprises polymerizing an aliphatic 1-olefin having from 3 to 8 carbon atoms per molecule in the presence of a catalyst which forms on mixing (a) a compound of the formula $R_nAlX_{3-n}$ wherein R is alkyl, cycloalkyl, aryl or combinations thereof having 1 to 12 carbon atoms, X is a halogen, and $n$ is 1 or 2, (b) a titanium trichloride-aluminum trichloride complex having the approximate formula $TiCl_3 \cdot \tfrac{1}{3}AlCl_3$ and (c) a compound selected from those of the formulas $(R'O)_3P$ and $$(RO)_2PR$$

wherein R is an alkyl, cycloalkyl, aryl, or combinations thereof having 1 to 12 carbon atoms, and R' is selected from mono- or dihalo-substituted alkyl, cycloalkyl and aryl groups and combinations thereof having from 1 to 12 carbon atoms and wherein the ratio of the compound (a) to the compound (b) is in the range of 0.5:1 to 10:1 and the ratio of the compound (c) to the compound (b) is in the range of 0.01:1 to 1:1.

6. A process according to claim 5 wherein said catalyst is formed by admixing (a) diethylaluminum chloride, (b) titanium trichloride-aluminum trichloride complex, and (c) tris(2-chloroethyl) phosphite.

7. A process according to claim 5 wherein said catalyst is formed by admixing (a) diethylaluminum chloride, (b) titanium trichloride-aluminum trichloride complex, and (c) octyldiphenyl phosphonite.

8. A process according to claim 5 wherein said catalyst is formed by admixing (a) diethylaluminum chloride, (b) titanium trichloride-aluminum trichloride complex, and (c) triphenyl phosphonite.

9. A process according to claim 5 wherein the polymerization is carried out at a temperature in the range of 80 to 250° F., at a pressure sufficient to maintain the reaction mixture in the liquid phase.

10. A process according to claim 5 wherein said 1-olefin is propylene and hydrogen is present in a concentration of about 0.08 to 1 mol percent of said olefin.

References Cited

UNITED STATES PATENTS

| | | | |
|---|---|---|---|
| 3,040,014 | 6/1962 | Lovett et al. | 260—93.7 |
| 3,210,332 | 10/1965 | Lyons et al. | 260—93.7 |
| 3,414,554 | 12/1968 | Kahle et al. | 260—93.7 |

FOREIGN PATENTS 921,954  3/1963  Great Britain.

JOSEPH L. SCHOFER, Primary Examiner

E. J. SMITH, Assistant Examiner

U.S. Cl. X.R.

252—429; 260—88.2